United States Patent [19]

Brosh et al.

[11] Patent Number: 4,503,922

[45] Date of Patent: Mar. 12, 1985

[54] ELECTRONIC BATHROOM SCALE APPARATUS USING PLANAR COIL SENSORS

[75] Inventors: Amnon Brosh, Montvale, N.J.; David Fiori, Jr., Yardley, Pa.

[73] Assignee: Bitronics, Inc., Montvale, N.J.

[21] Appl. No.: 498,536

[22] Filed: May 26, 1983

[51] Int. Cl.³ .......................... G01G 3/14; G01G 3/16
[52] U.S. Cl. ..................... 177/210 EM; 177/210 FP
[58] Field of Search ...... 177/210 EM, 210 C, 210 FP

[56] References Cited

U.S. PATENT DOCUMENTS

| | | | |
|---|---|---|---|
| 3,799,281 | 3/1974 | Wernitz | 177/210 EM |
| 4,042,876 | 8/1977 | Visioli, Jr. | 324/207 |
| 4,366,875 | 1/1983 | Dauge et al. | 177/210 C |
| 4,405,025 | 9/1983 | Yanagita et al. | 177/210 FP |
| 4,425,511 | 1/1984 | Brosh | 307/106 |
| 4,458,770 | 7/1984 | Bucci | 177/210 C |

Primary Examiner—E. A. Goldberg
Assistant Examiner—Patrick W. Foster
Attorney, Agent, or Firm—Arthur L. Plevy

[57] ABSTRACT

An electronic bathroom scale employs a low profile planar coil position sensor which responds to the positioning of a pivotable lever system. The levers are coupled to a platform which moves in the vertical direction as a weight is placed upon the top or supporting platform of the scale. The sensor provides variable amplitude or frequency proportional to the weight on the scale. The output signal is processed so that a direct reading of the weight is displayed by means of a digital display. The circuitry described serves to compensate for the nonlinearity of the transducer while further providing other compensation to eliminate environmental effects such as temperature and other factors from affecting the direct display of weight.

14 Claims, 18 Drawing Figures

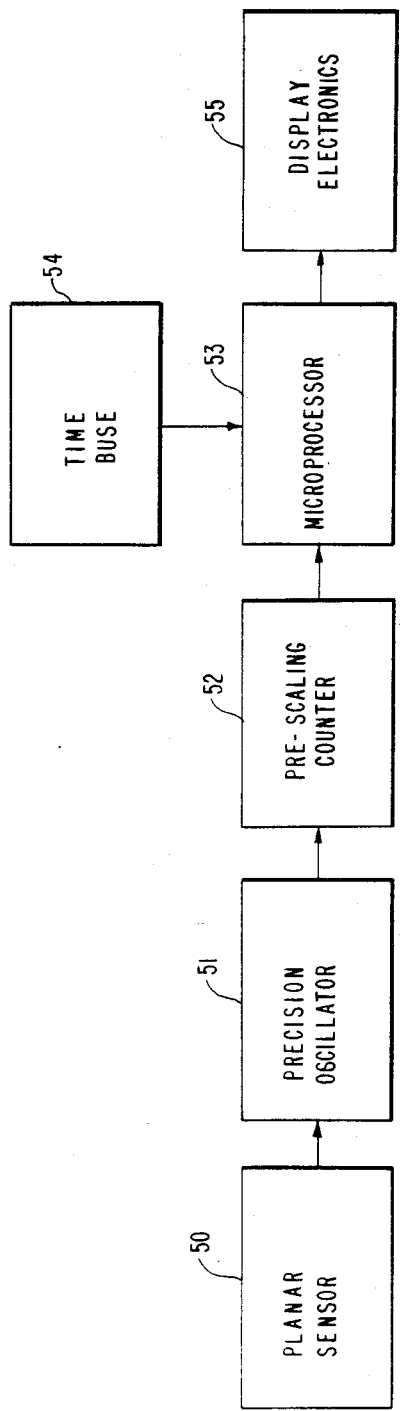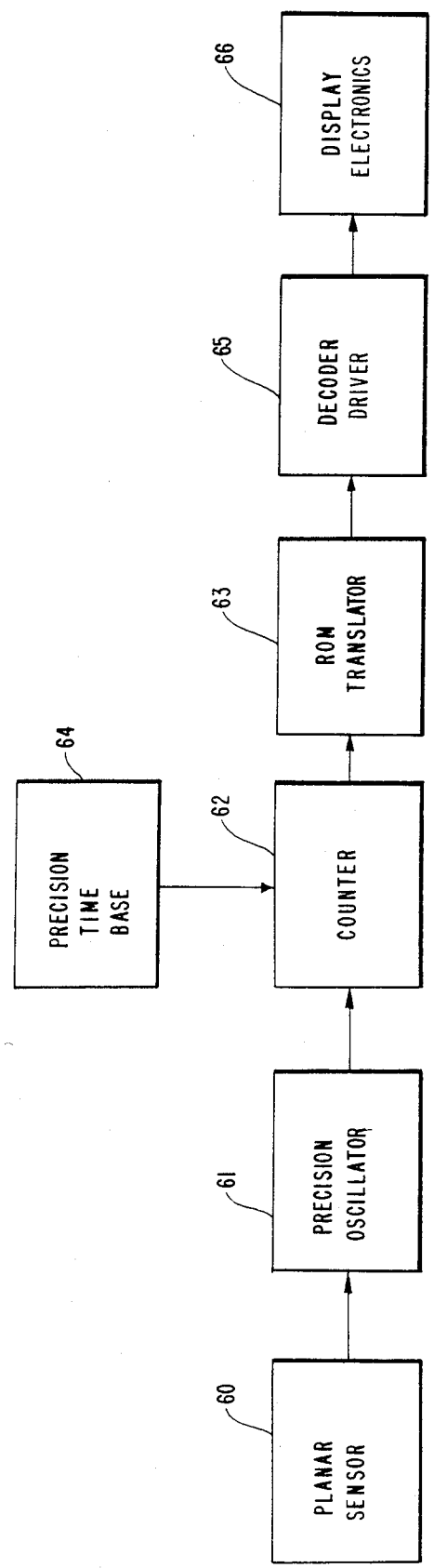

ELECTRONIC BATHROOM SCALE APPARATUS USING PLANAR COIL SENSORS

BACKGROUND OF INVENTION

This invention relates to simple, low cost electronic scales in general and more particularly to an improved low profile bathroom scale utilizing a planar coil displacement transducer.

Most present day bathroom scales use inexpensive lever systems to convert weight into vertical motion which, in turn, is converted into horizontal or rotary motion. In electronic bathroom scales the vertical or rotary motion is converted by means of incremental encoders or position sensors to provide an electrical signal.

As indicated above, most of the present day bathroom scales which are relatively inexpensive are based on a flexure arrangement which essentially collects the weight on the platform as distributed in the four corners and converts to one simple linear deflection which works against a spring. In conventional mechanical scales this deflection is converted into a large rotary motion by means of a gear and rod and the weight is indicated by means of a rotatable disk which has weight markings about the periphery. In the electronic version, the disk is transparent, the lines are etched on it, and the motion is picked up by an optical sensor.

In other electronic bathroom scales the vertical motion is coverted into a relatively large horizontal displacement which is sensed by a LVDT and then converted into a digital signal. Essentially, as above indicated, most scales do not operate to sense the vertical motion of the platform but use relatively crude conversion into a large horizontal motion or into a large rotary motion. The requirement to convert to large horizontal displacements (such as 0.5") or large rotary motion (such as 330°) dictate that the mechanism must be very compliant and therefore subject to errors such as zero drift and non-repeatability.

It is possible to use a pressure sensor or a strain gage which is mounted on a cantilever beam to provide an output voltage proportional to the weight placed on the platform. This output voltage may be converted to a frequency or otherwise employed to activate an electronic circuit to thereby produce a digital output indicating the magnitude of the weight. However, these approaches are relatively costly. A further restriction is that the motion sensor must be relatively low profile as bathroom scales must be relatively flat for the convenience of the user.

In the present invention, there is provided a means for sensing the vertical motion directly using a low profile displacement transducer which is also low-cost and suitable for mass-production. To be defined as low profile, a displacement transducer used to sense horizontal motion in a bathroom scale, must meet the following requirements:

1. It must be able to detect small vertical deflection such as 0.050 inch to 0.100 inch.
2. It must not be substantially higher than the displacement it measures.

To be defined as suitable for mass-production, a transducer must meet the following requirements:
1. It must be produced using a batch process technique.
2. It must have a low parts count.
3. It must be easy to assemble.

As will be explained, the displacement transducer in this invention meets all the requirements. Further, the arrangement simplifies the bathroom scale mechanism by eliminating the need for a motion conversion such as vertical to horizontal or vertical to rotary. As will be further explained, the apparatus of the present invention allows one to detect small vertical motions, enabling to make the mechanism much stiffer and more accurate. As one will understand, it is a major objective of the present invention to provide a low profile electronic scale apparatus which employs a low cost reliable and repeatable displacement sensor device whose output is converted by means of electronic circuitry to an accurate digital readout of the weight.

BRIEF DESCRIPTION OF THE PREFERRED EMBODIMENT

Transducer apparatus for providing an electrical output signal indicative of the movement of a platform as included in a weighing scale, said platform mechanically coupled to a lever means, which lever means provides a vertical movement in accordance with the amount of weight placed on the platform, in conjunction therewith, a first planar board positioned beneath said platform and relatively parallel thereto, said board having deposited on a surface at least one planar coil configuration, a second planar member pivotally coupled to said planar board at one end and adapted when pivoted to move towards or away from said first planar board, said other end of said planar member coupled to said lever means, whereby said member moves with respect to said first planar board in accordance with said vertical movement and circuit means coupled to said planar coil to provide an electrical output signal which varies according to the movement of said second planar board with respect to said first.

BRIEF DESCRIPTION OF THE FIGURES

FIG. 7 is a simplified block diagram of one embodiment of a bathroom scale employing a microprocessor.

FIG. 8 is a simplified schematic diagram of an electronic scale employing a translator according to this invention.

DETAILED DESCRIPTION OF THE FIGURES

Figure 1:
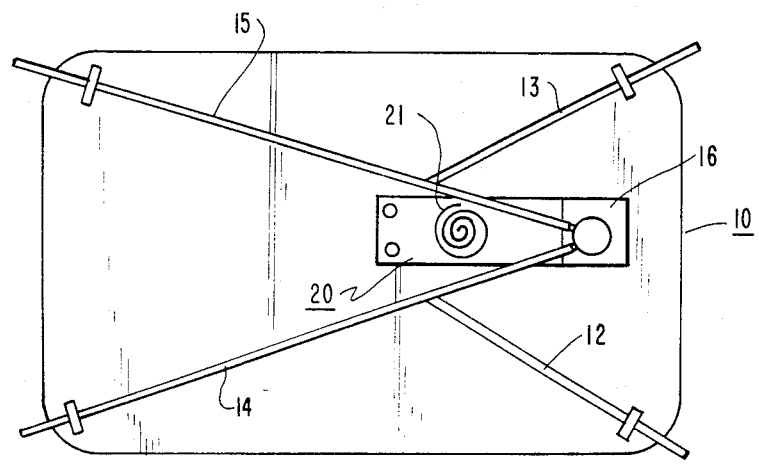
FIG. 1 is a top plan view showing a diagrammatic format of a scale according to this invention.

Referring to FIG. 1, there is shown a top view of a bathroom scale apparatus 10. Essentially as depicted in FIG. 1, weight which is placed on the top platform of the scale, is concentrated by means of a plurality of levers as 12, 13, 14 and 15. The levers are coupled to each of the four corners of the scale and operate to collect and sum up the weight of the platform upon which a person stands. The four levers as depicted in FIG. 1 may be arranged in a variety of configurations as is well known. In any event, the common aspect between all the lever systems is to provide for the summation of the weight in order to convert the same into a single vertical deflection which is inherently insensitive to the distribution of weight on the platform. In a typical scale the vertical motion may vary from 0.040 inches to 0.3 inches depending on the type of scale. However, for a stiff system, vertical motion should not exceed 0.1 inch.

In FIG. 1, as seen, the lever arms 12 and 13 are coupled to arms 14 and 15. The arms 14 and 15 are directed to a spring loaded force collector member 16. Positioned adjacent to the member 16 is a displacement transducer 20. Essentially, the transducer 20 contains a static board 35 (or 235) upon which one or two printed circuit coils such as 21, 202, 203 which are a spiral configuration and which are deposited upon the board by means of conventional printed circuit techniques. A moving plate 37 (or 237) is attached to the static board on one end. Its moving end is attached to the vertical motion of the lever system. The motion of the moving board is converted into an electrical output.

Figure 2A:
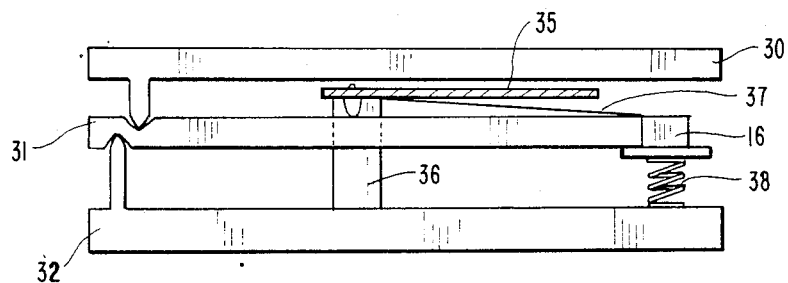
FIGS. 2A and 2B are side views of two versions of the apparatus shown in FIG. 1.

Referring to FIG. 2A, there is shown a diagrammatic view of the scale apparatus depicted in FIG. 1. Essentially, the scale has a top platform 30 upon which a person to be weighed stands. The top platform is coupled to the lever arms or a lever arrangement 31 which also is movable with respect to the bottom base 32. The static board 35 containing the planar coil or coils is secured to an upstanding platform 36 attached to the base of the scale 32. Depending from the board is a moving plate 37 which is coupled to the force collecting member 16. The member 16 is biased by means of a spring 38.

As can be seen from FIG. 2A, when a weight is placed upon platform 30, the moving plate 37 moves away from the static board 35. The movement of the moving plate 37 towards the static board 35 is a function of the weight on the platform. As the moving plate 37 moves away from the coil, it causes a change in the output of the displacement transducer as will be shown.

Figure 2B:
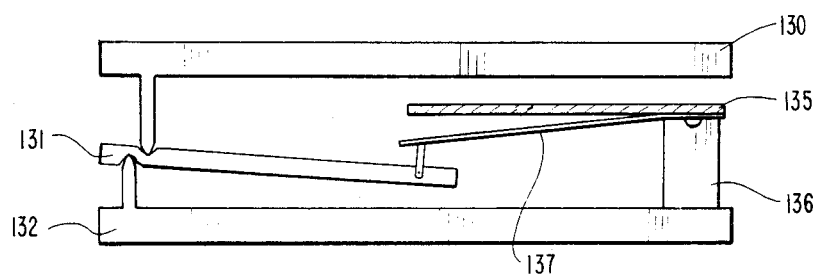

As can be seen from FIG. 2B, the moving plate 37 may be made into a self-supporting cantilever and be directly coupled to the lever apparatus 131 and thus the spring 38 can be eliminated. The spring constant of the cantilever 137 takes the place of spring 38, providing a simpler more accurate system.

Figure 3A:
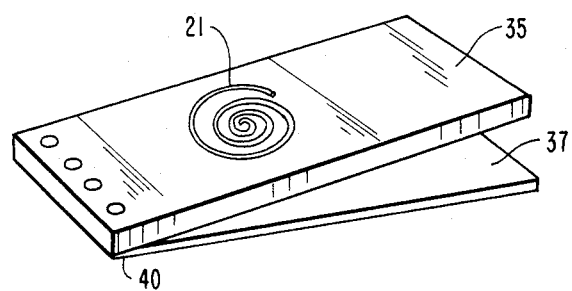
FIGS. 3A and 3B are perspective views of planar coil displacement sensors according to this invention.

Referring to FIG. 3A, there is shown an enlarged configuration of the static board with coil 21 and the moving plate 37. Essentially, the plate 37 may be referred to as a spoiler plate and is secured to the static board 35 at one end 40 to provide a hinged joint so that the plate 37 may move or pivot in the direction of the arrows. The board 35 is held rigid as shown in FIGS. 2A and 2B while the plate 37 is coupled to the movable force collecting member 16 which causes the spoiler to move away from the coil 21 to vary the effective Q of the coil according to such movement.

As indicated, the coil 21 is a planar coil and is printed on an insulated substrate 35 by means of conventional printed circuit techniques. The plate or spoiler essentially is a flap as shown in FIG. 3A which is joined at one end to the board 35 on which the planar sensor coil is printed. The other end of the flap 37 is attached to the source of motion so that the flap is moved vertically towards or away from the coil.

Figure 3B:
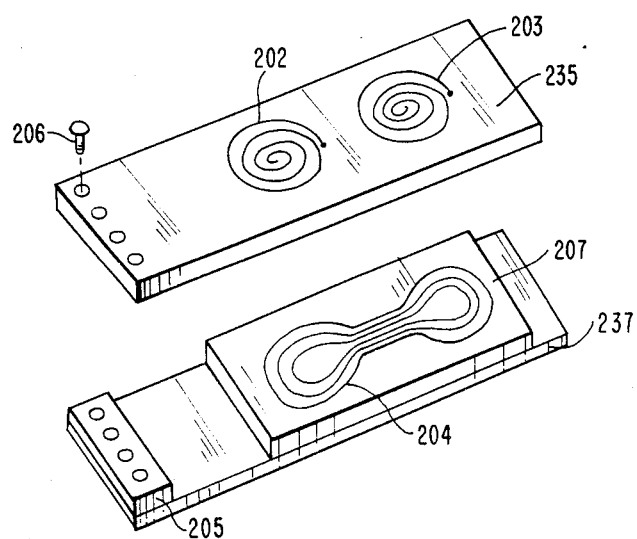

As indicated, the moving plate 37 can be a metal plate which is fabricated from a conductor such as copper, aluminum, stainless steel and so on. In a similar manner as shown in FIG. 3B, the moving plate may contain a shorted coil arrangement 204 printed on board 207 and attached to plate 237 in this case, the static board 235 contains two planar coils 202 and 203. The motion of plate 237 with its shorted coil structure 204 varies the coupling between coils 202 and 203 to provide an output. The moving plate 237 and the static board 235 are bolted together using spacer 205 and screws 206.

As is evident from FIGS. 3A and 3B, the displacement transducers meet the criteria of low profile since the total height of the device consists of the thickness of board 35 and plate 37 plus the spacing between them at full deflection. For example, for a displacement of 0.100 inch, the height of a typical transducer is under 0.2" inches. Commercially available LVDT with 0.100" displacement are at least 1.5 inches high.

As to low cost and mass-production, it can be seen that the transducer in FIG. 3A consists of two major parts only. The static board 31 is a printed circuit structure which lends itself to low cost batch processing. The moving plate 37 is a metal flap which can be stamped. The assembly is extremely simple since it involves bolting the two parts together. The displacement transducer in 3B is only marginally more costly to manufacture and to assemble.

Referring again to FIG. 3A, the principle of operation of the displacement transducer shown, is the change in Q of the planar coil 21 in response to change in the distance of the spoiler 37. This change in Q may be converted, by means of the associated electronic circuitry, into a change in amplitude or a change in frequency of an AC signal. While both approaches work, it was found that the most effective implementation for the device shown in FIG. 3A is the one which utilizes the frequency change vs. moving plate displacement. A typical oscillator circuit which operates in conjunction with the displacement transducer of FIG. 3A is shown in FIG. 4.

Figure 4:
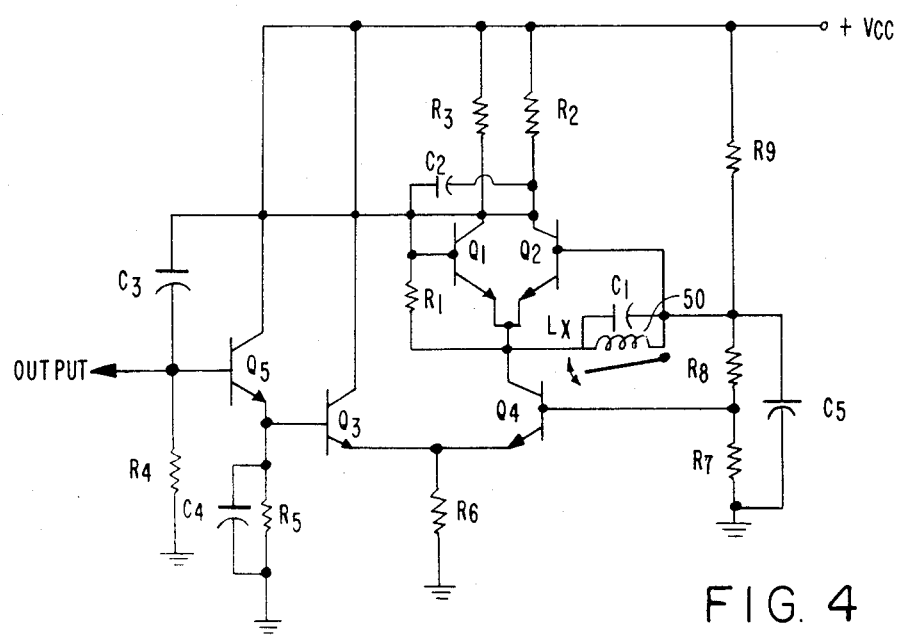
FIG. 4 is a detailed schematic diagram of an oscillator used in this invention.

Referring to FIG. 4, there is shown a schematic diagram of the precision oscillator 51. Essentially, the planar sensor 50 constitutes the inductance designated in the schematic as $L_x$. The frequency of the oscillator is determined strictly by the inductor $L_x$. The oscillator configuration provides low temperature sensitivity and has a fast turn on time as required in a bathroom scale operation. Essentially, the oscillator consists of a first differential amplifier consisting of transistors $Q_3$ and $Q_4$ with the emitter coupled together and directed to a source of reference potential through the common resistor $R_6$. The collector of transistor $Q_3$ is coupled directly to the source of operating potential. The collector of transistor $Q_4$ is directed to the common emitter connection of transistors $Q_1$ and $Q_2$ each having a collector resistor coupled to the source of operating potential. The collector of transistor $Q_2$ provides AC feedback to the base of transistor $Q_1$ and is coupled through $R_1$ to one terminal of the coil 50. The other terminal of the coil is coupled to the base electrode of transistor $Q_2$. A base biasing for transistor $Q_4$ is obtained through the voltage divider consisting of resistors $R_7$, $R_8$ and $R_9$ with the junction between resistors $R_7$ and $R_8$ connected to the base of transistor $Q_4$.

A capacitor $C_1$ is directed from on terminal of coil 50 to the junction between resistors $R_8$ and $R_9$ while capacitor $C_5$ is connected from the junction to the point of reference potential. Biasing for transistor $Q_3$ is obtained by connecting the base of transistor $Q_3$ to the emitter of transistor $Q_5$ which emitter electrode is connected to ground through resistor $R_5$ shunted by capacitor $C_4$. The collector electrode of transistor $Q_2$ is further AC coupled to the base electrode of transistor $Q_5$ via capacitor $C_3$ with the base electrode of transistor $Q_5$ coupled to ground through resistor $R_4$.

The above noted oscillator, employing differential gain stages serves to eliminate operating point variables due to amplifier bias offsets. The oscillator operating point is controlled by the feedback circuit so that the mode of the oscillator is saturated to eliminate amplifier gain variations. The oscillator can be implemented by using conventional integrated circuits such as commercially available differential amplifier structures to allow for an inexpensive and stable oscillator which is necessary to provide reliable operation in the bathroom scale environment.

Figure 5A:
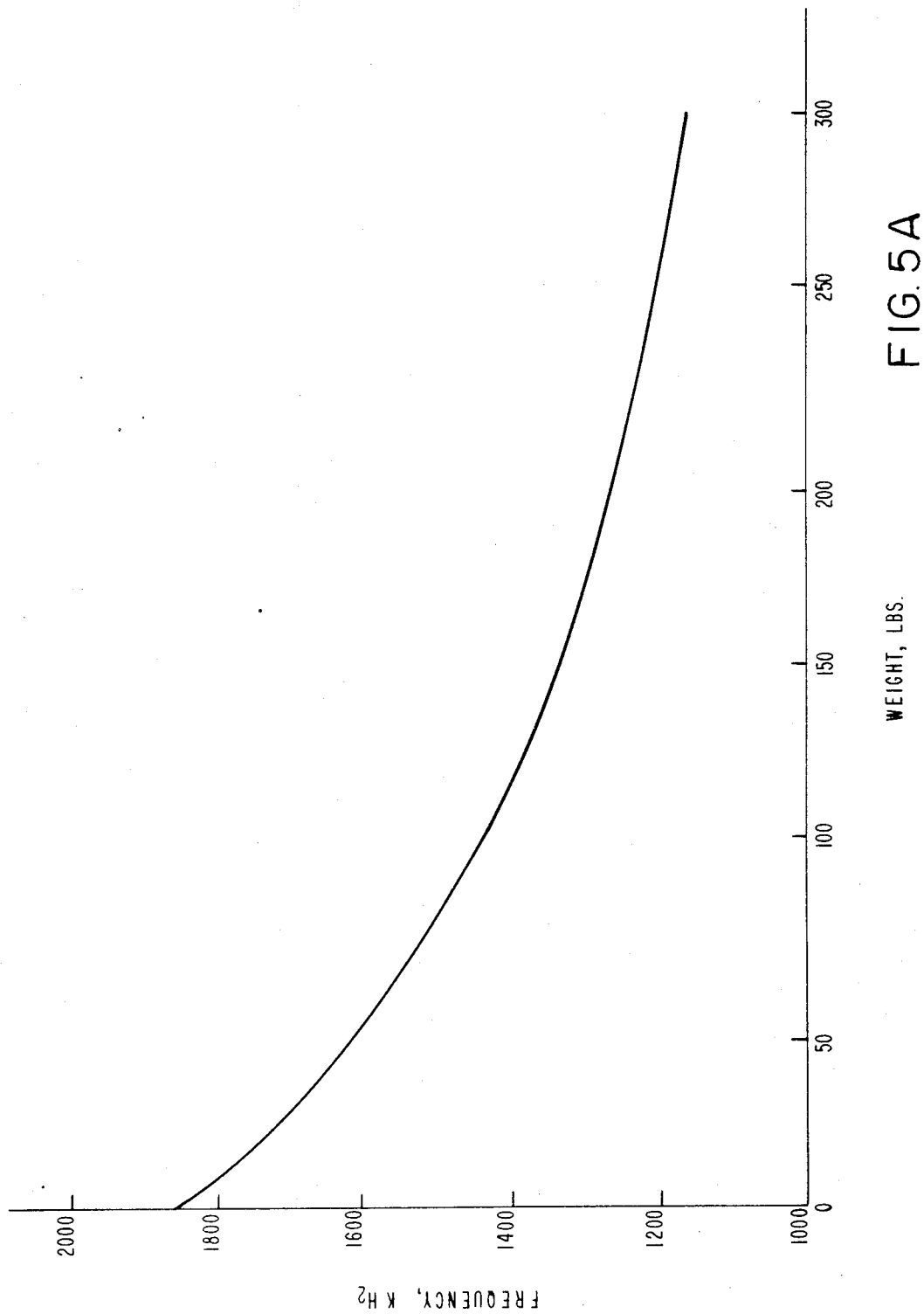
FIGS. 5A and 5B are output versus weight graph of sensors operating according to this invention.

Using the oscillator shown in FIG. 4 and a displacement transducer shown in FIG. 3A with a planar coil 21 having a 1.5 inch diameter printed on a double sided printed circuit board with plated through holes, an aluminum spoiler and a displacement of 0.08 inches corresponding to a full scale weight of 300 lbs., a frequency vs. weight curve is obtained as shown in FIG. 5A.

Referring now to FIG. 3B, the principle of operation of the displacement transducer shown, is the change in coupling between coils 202 and 203 of static board 235 in response to change in distance of the moving plate 237. The coupling between coils 202 and 203 is accomplished by the shorted coil pattern 204 which is printed on printed circuit board 207 and attached to moving plate 237. The change in coupling may be converted by an appropriate electronic circuit to a change in amplitude or a change in frequency of an AC signal. While both techniques have worked satisfactorily, it was found that in the case of the device of FIG. 3B, the amplitude mode of operation is the most effective.

Basically, in this arrangement one of the coils, for example coil 203, is used as a "drive coil" while second coil 203 is used as a "sense" coil. The drive coil is driven by an AC signals, such as a sine wave or narrow pulses, and the signal which is coupled to the "sense" is detected and converted into a DC signal. This DC signal varies as a function of the moving plate position.

Figure 6:
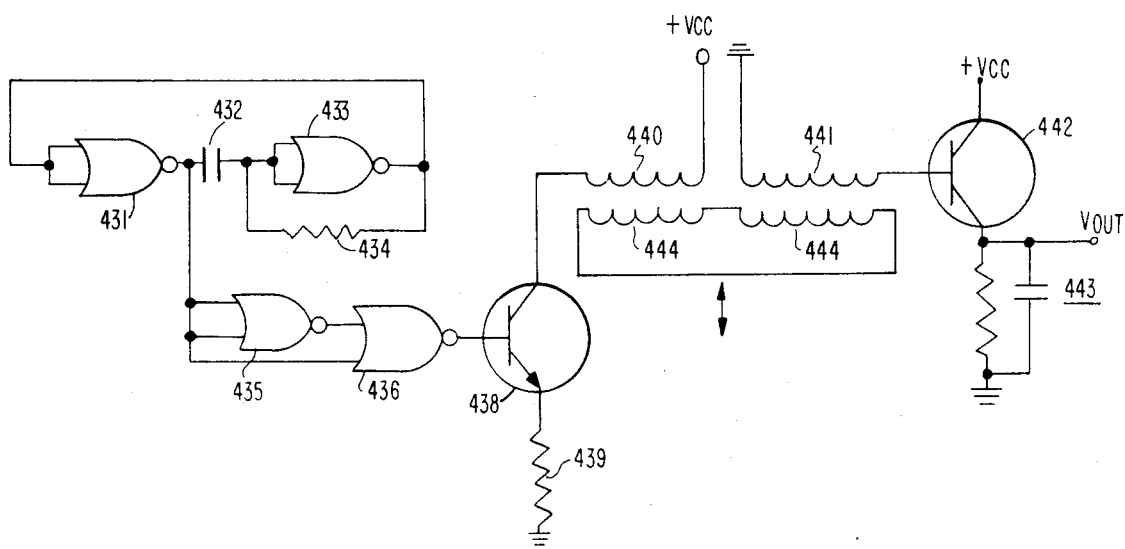
FIG. 6 is a detailed schematic diagram of an amplitude drive-sense circuit.

A detailed circuit diagram for driving the displacement transducer and detecting its output is shown in FIG. 6. It should be noted that while narrow pulses were used, other arrangements utilizing sine waves and other wave shapes may also be e employed.

Referring to FIG. 6, there is shown a circuit employing a shorted coil and coil 204 of FIG. 3B which coil is coupled to the movable plate board. The circuit depicted in FIG. 6 is also shown in a copending application entitled Drive and Detection Circuitry for Planar Coil Sensors filed on May 10, 1982 as Ser. No. 376,534 and assigned to the assignee herein. Essentially, the circuit depicted in FIG. 6 as will be explained provides an amplitude output which is proportional to the separation between the movable shorted coil and the stationary coils. The circuit consists of a first NOR gate 431 having an output coupled via a capacitor 432 to the input of a second NOR gate 433. The output of gate 433 is directed back to the input of gate 431 to provide a square wave oscillator. Coupled between the input and output of gate 433 is a resistor 434. The output of gate 431 is directed to the input of an additional NOR gate 435 and to one input of a gate 436. The output of gate 435 is connected to the second input of gate 436. The output of gate 436 is connected to the base electrode of NPN transistor 438. The collector electrode of transistor 438 is coupled to one terminal of the stationary coil 440 having its other terminal coupled to a point of operating potential designated as $V_{cc}$.

Coil 440 is coupled to coil 441 as a function of the position of the shorted coil 444 when moved by the scale mechanism towards or away from the stationary coils 440 and 441. Essentially, gates 431 and 433 provide a square wave by the charging and discharging of capacitor 432 through resistor 434. This occurs due to gate 433 responding to the voltage developed at its input. The square wave output from gate 431 is applied to the input of gate 435 which acts as an inverter and delay. Gate 436 compares the delayed and inverted signal from gate 435 with the input signal from gate 431. Whenever the output signal from gate 431 changes state from a 1 to a 0, then for a short time the output of gate 435, due to the delay, will remain at logic 0. For the brief period, both inputs to gate 436 will be at the logic 0 level. Therefore, the output of the gate 436 will go positive.

Extremely narrow pulses are thereby applied to the base of transistor 438. During the short pulses, the transistor delivers a large current to coil 440. This causes the coil to resonant at a frequency between 1.0 Mhz to 80 Mhz. This provides a relatively large voltage across coil 440 which is applied to coil 441 in a magnitude depending upon the position of the shorted coil 444. The output transistor 442 has its base electrode connected to one terminal of coil 444. Transistor 442 operates as a peak detector to peak detect the signal coupled from coil 441. The emitter electrode of transistor 442 is returned to ground via the parallel combination of a resistor and a capacitor designated as 443. The transistor 442 acts as a peak detector because if the voltage of the base electrode exceeds the base to emitter junction voltages, plus the voltage at the emitter, then the transistor 442 will charge the capacitor at the emitter with a large current until the transistor is cut off.

In this manner the output at the emitter electrode designated as V out is a true indication of the peak voltage applied to coil 441 according to the position of the shorted coil 444 in relation to coils 440 and 441.

Thus, the above described circuit produces a peak detected output which will provide a varying amplitude signal depending on the position of the shorted coil with respect to the stationary coils.

Figure 5B:
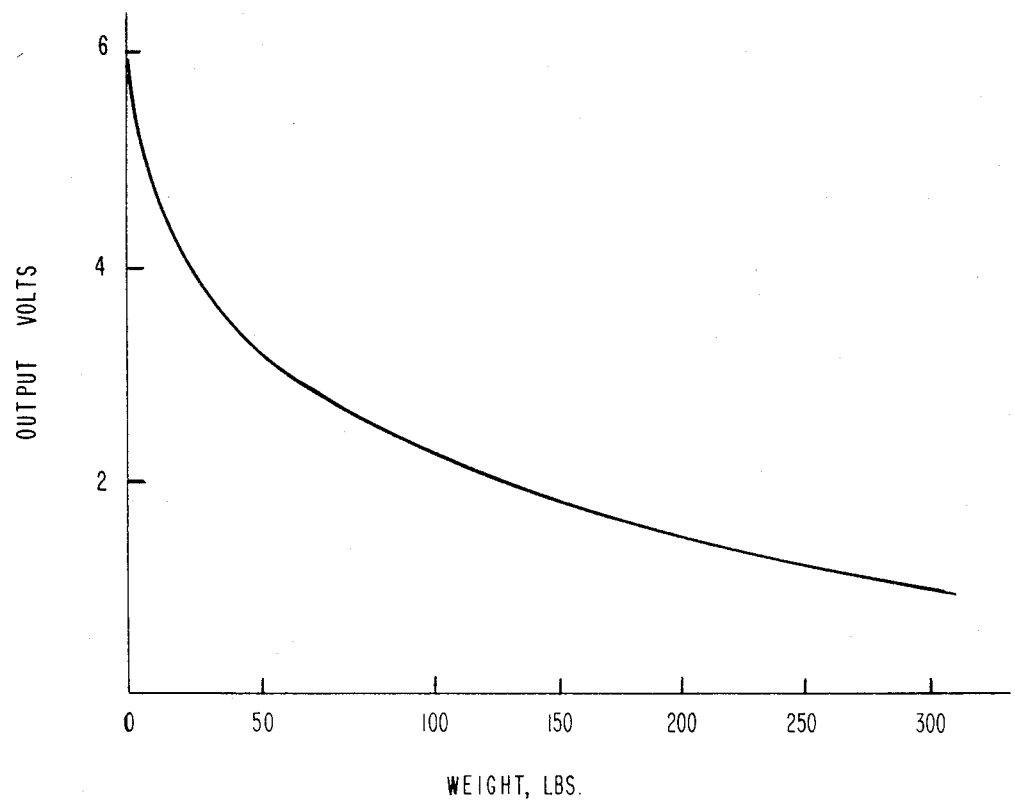

Using the circuit shown in FIG. 6 and a displacement transducer shown in FIG. 3B with a pair of planar coils 202, 203 of 1.0 inch diameter each printed on double sided plated through printed circuit board, and a displaement of 0.1 inch corresponding to a full scale weight of 300 lbs., a DC voltage vs. weight curve is obtained as shown in FIG. 5B.

Referring to FIGS. 5A and 5B, there is shown an output versus weight as the type of output obtained from the displacement transducer according to this invention. As one can see, the output versus weight, or position, is not a linear function. Hence, as will be explained, the electronic circuitry to be described provides a linearization of the output to thereby produce a final reading which is directly associated with the actual weight placed on the platform.

While, as stated earlier, the displacement transducers described in this invention provide both an amplitude and a frequency output vs. weight, for low cost bathroom scale applications, the frequency mode of operation may be more desirable. The DC output obtained in the amplitude mode of operation as shown in FIG. 5B, requires an analog to digital convertor in order to convert the DC signal to a format which will provide a digital weight readout. Analog to digital convertors are relatively costly devices, especially if increased resolution is desirable.

On the other hand, the frequency mode of operation provides a frequency output which is easy to digitize and to convert to a digital readout. It is for this reason that this mode of operation is selected here to demonstrate the performance of the bathroom scale of the present invention. However, it is understood that many of the principles of operation described also apply to a bathroom scale using a planar coil displacement transducer using the amplitude mode of operation.

Referring to FIG. 7, there is shown a simple block diagram of an electronic circuit used to provide a digital readout and which employs a sensor of the type shown in FIG. 3A operating in the frequency mode and providing an output as shown in FIG. 5A. Essentially, the planar sensor 50 is coupled to a precision oscillator 51 as shown in FIG. 4. The output of the oscillator thereby provides a variable frequency as a function of the moving plate associated with the planar sensor 50. It is of course understood that the frequency varies as shown in FIG. 5A.

The output of the oscillator is directed to the input of a pre-scaler 52.

Figure 9:
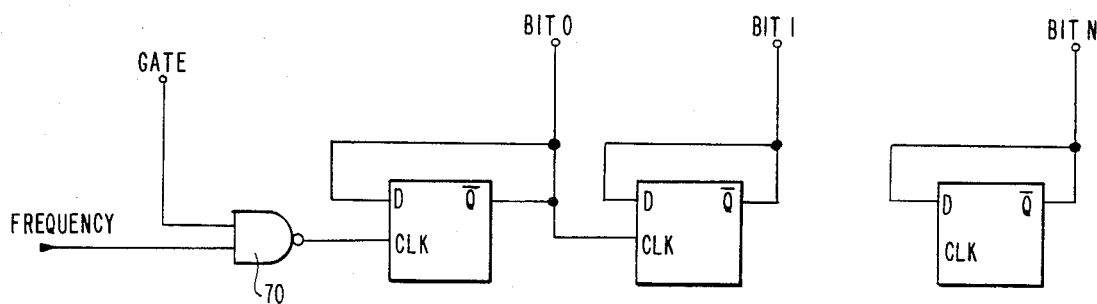
FIG. 9 is a schematic diagram depicting a counter used in the embodiment shown in FIG. 7.

The pre-scaler 52 is basically a counter which operates to divide the oscillator frequency to a rate that can be handled by the microprocessor directly. The pre-scaler essentially is a digital frequency divider which consists of a plurality of cascaded multi-vibrators which serves to divide the input frequency from the oscillator by a factor of 2N where N is equal to the number of bi-stable multivibrators employed. A typical counter is shown in FIG. 9 which counter consists of N stages and which has an input "AND" gate 70 and a first input of gate 70 coupled to the output of the oscillator 51.

The output as well as the input marked "gate" are connected from the pre-scaler 52 to a microprocessor 53. The microprocessor 53 is also a well known circuit component. For a low cost bathroom scale application a four bit microprocessor is employed since it is available from a host of manufacturers at very low prices.

Essentially, the microprocessor, by suitable programming, serves several important functions which are essential to the operation of the planar displacement transducer in a bathroom scale application. First, the microprocessor 53 serves to count, integrate and average the pulses arriving from the pre-scaler 52. This is an important function since a major source of error in human weight measurement is the vibration induced by a person standing on a scale. This problem is overcome by averaging the measurement over a relatively long period, such as a one-second period. The use of the microprocessor for averaging saves a large number of frequency dividing stages required to reduce the time base to one second for example.

Second, the microprocessor is employed to linearize the output vs. weight characteristics of the planar displacement transducer. Linearization algorithms are well known and such arrangements as look-up tables can be easily employed to linearize the output of any planar displacement transducer. Furthermore, the planar displacement transducer shown in FIG. 3A, employed in the frequency mode, and providing the output vs. weight curve shown in FIG. 5A, can be linearized using a very simple arithmetic algorithm. It was determined that if $D_x$ is the unlinearized output of this planar displacement transducer at weight (X), the following formular will provide a linear fit to better than 0.25 percent:

$$W_X = \frac{D_x}{D_X - C}$$

where $W_X$ is the linearized output at weight (X) and C is a constant selected for best fit.

Third, the microprocessor may be further employed to assist in compensating for sensor and electronics errors by use of appropriate correcting algorithms when the sensing system is used in a multiplexed ratiometric mode as will be explained later.

Fourth, the microprocessor is employed to provide the sequencing for the weighing operation. Normally, the sequencing involves a stabilization period of approximately 2 seconds, an averaging period of approximately 1 second and an automatic turn off period of several seconds to minimize battery use. In the multiplexed ratiometric mode, there may be some further time intervals required which the microprocessor may provide. Last, the microprocessor also provides all the logic necessary to properly drive the various elements of the display electronics 55.

Figure 10:
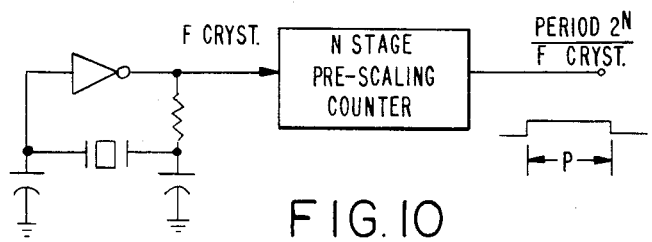
FIG. 10 is a schematic diagram of a time base circuit used in this invention.

The time base 54 basically consists of an oscillator circuit. A crystal controlled oscillator may be employed in the non-ratiometric approach to provide a precision time base for counting as shown in FIG. 10. In the ratiometric mode, time base errors are compensated out and the stability of the time base oscillator is not critical.

Display electronics 55 consists of commercially available readout components such as LED. No additional circuitry is required when using appropriate microprocessor.

Referring to FIG. 8, there is shown a block diagram of a very simple electronic scale configuration which does not employ a microprocessor and yet performs the required linearization correction. Essentially, the planar displacement transducer 60 is the same as described above. The oscillator 61 is of the same configuration as the oscillator shown in FIG. 4. The output of the oscillator 61 is coupled to the input of a counter 62 employed here for counting the frequency of the oscillator using a precision time base 64.

The circuit 64 is shown in FIG. 10 and consists of a crystal controlled oscillator whose output is coupled to a pre-scaling counter, employed to divide the time base frequency to provide a long counting period, which again is a cascaded digital flip flop chain. It is for example the type or circuit which can be used for the time base 54 depicted in FIG. 5. The output of the counter 62 is directed to the input of a translator 63. Essentially, the translator 63 consists of one or more read only memories (ROMS).

Figure 11:
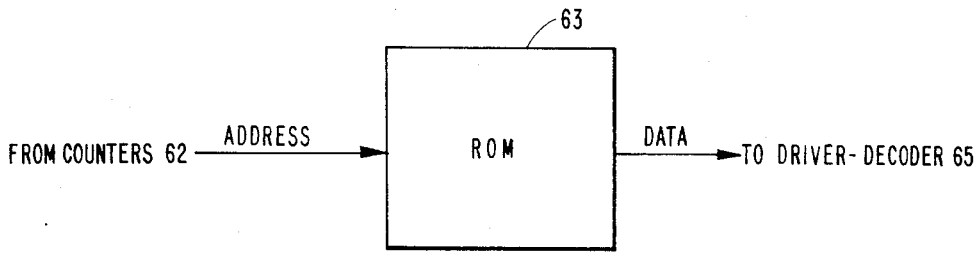
FIG. 11 is a block diagram of a translator used in the embodiment of FIG. 7.

Referring to FIG. 11, ROM 63 is used in the following manner: The unlinearized reading obtained from counters 62 is fed into the address input of the ROM. The ROM is programmed such that the data output corresponding to the various addresses provides linear weight information. For example, the type of output vs. weight shown in FIG. 5A will have close to 1000 different counter readings. These will be converted by the ROM program to provide 300 linearized readings for a 0 to 300 lbs. scale.

Since 300 readings represent 9 bits and most commercially available ROMS have 8 bit data output, a custom ROM could be used. Also two commercially available ROMS might be employed and the data be made available in BCD, or binary coded decimal, form. This enables using a standard BCD to seven segment decoder-driver 65 to drive the display electronics.

Figure 12A:
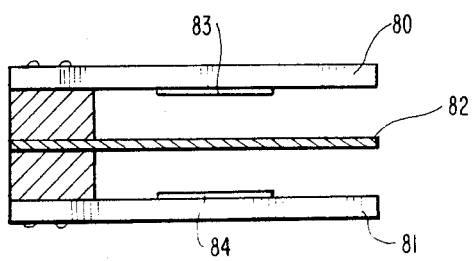
FIGS. 12A and 12B is a side view of a differential sensor configuration.
Figure 12B:
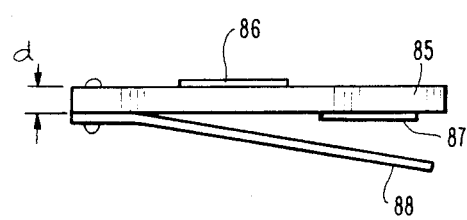

Referring to FIGS. 12A and 12B, there is shown a dual coil placement displacement transducer which can be employed in the invention to provide a multiplexed ratiometric mode of operation. It is based on the feature that extra coils may be added to planar displacement transducer at very low additional cost.

In FIG. 12A, the moving plate 82 is positioned between two static boards 81 and 82. In FIG. 12B, there is only one static board, however the planar coil surface 86 and 87 are spaced apart by distance D. Coils 83 and 84 of FIG. 12A and coils 86 and 87 of FIG. 12B may be single coils as in FIG. 3A with the moving plate 82 of FIG. 12A and 88 of FIG. 12B being a metal spoiler also as in FIG. 3A. Or the coils 83, 84, 86 or 87 may be each a pair of coils as in FIG. 3B and the moving plates 82 or 88 a shorted coil structure also as in FIG. 3B. Further, the mode of operation may be amplitude or frequency as explained earlier, however, the following discussion relates to the frequency mode of operation. The same technique may also be applied to the amplitude mode of operation.

Basically, each of the displacement transducers shown in FIGS. 12A and 12B have planar coil sensors placed on two different planes in respect to the moving plate. The coils are operated in a multiplexed ratiometric mode.

Referring to FIG. 12A, the boards 80 and 81 each contain planar coils 83 and 84 configurations on the surface. The boards are separated by a spoiler 82 which is attached to the movable force collector member 16 of the scale. In the operation the oscillator is switched from the top coil to the bottom coil using multiplexing techniques. As will be explained, the frequency due to the coil on the top board is stored and divided by the frequency due to the coil on the bottom board.

Figure 13:
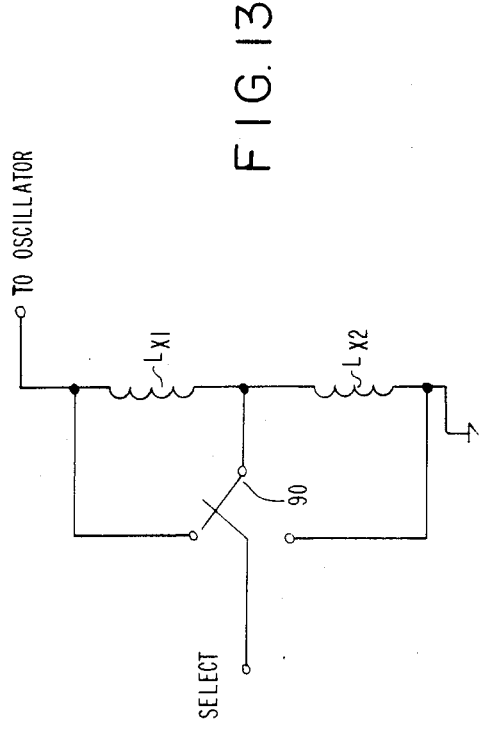
FIG. 13 is a schematic diagram of the sensor of FIG. 11.

Referring to FIG. 13, there is shown a circuit schematic of two planar coils which are multiplexed by means of a switch 90. The switch 90 is controlled by a clock and may for example be a gate which causes either coil $L_{X1}$ or $L_{X2}$ to be switched into the oscillator circuit. The switch 90 may be a low-cost analog switch array which is conventionally provided in CMOS technology.

Figure 14:
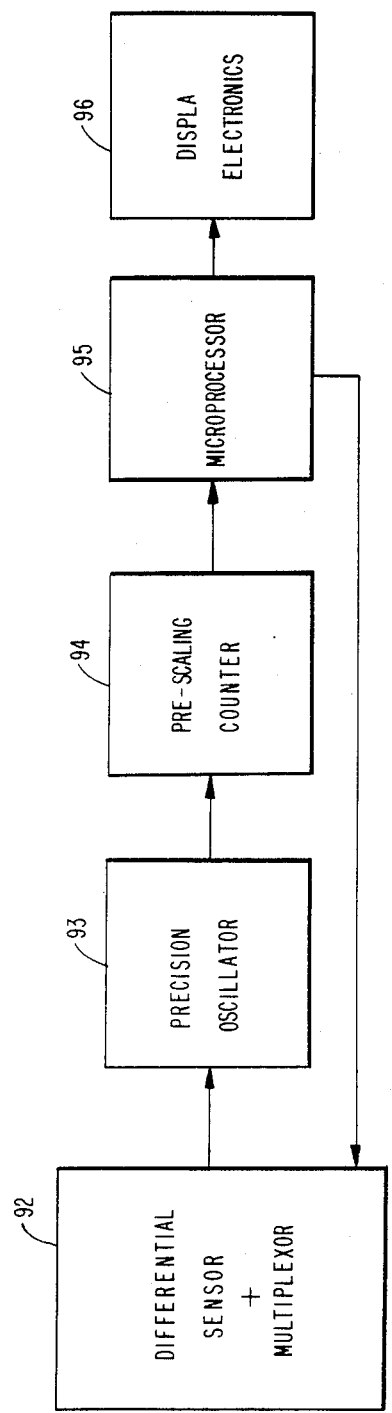
FIG. 14 is a simplified block diagram of an electronic scale according to this invention employing a differential sensor.

Referring to FIG. 14, there is shown the differential sensor 92 which is coupled to the precision oscillator 93. The oscillator 93 is of the same configuration of that shown in FIG. 4 with the exception that it employs the switched coils. The output of the oscillator 93 is coupled to a pre-scaling counter 94 whose output is coupled to a microprocessor 95. The microprocessor 95 controls the switch 90 of FIG. 13 to thereby select the period in which the top and bottom coils are selected. The microprocessor can be conventionally programmed to take the average of the frequencies as described above to thereby provide a digital output which is then displayed as the weight by means of the display electronics 96.

The advantage of this mode of operation is that oscillator and electrionic common mode errors as well as battery voltage and temperature changes are greatly reduced due to the division operation. Further, all time base errors also cancel out allowing for the use of simpler lower cost time base oscillators.

The arrangement of FIG. 12B works in much the same way. Its advantage is the use of one single static board and simpler construction while the advantage of the arrangement of FIG. 12A is the increase in output of the ratiometric arrangement since the device works in a differential mode.

We claim:

1. Transducer apparatus for providing an electrical output signal indicative of the movement of a platform as included in a weighing scale, said platform mechanically coupled to a lever means, which lever means provides a vertical movement in accordance with the amount of weight placed on the platform, in conjunction therewith, a first planar board positioned beneath said platform and relatively parallel thereto, said board having deposited on a surface at least one planar coil configuration a second planar member pivotally coupled to said planar board at one end and adapted when pivoted to move towards or away from said first planar board, said other end of said planar member coupled to said lever means, whereby said member moves with respect to said first planar board in accordance with said vertical movement, a third planar board positioned parallel to said first board and located beneath said planar member, said third board having deposited on a surface at least one planar coil of a configuration similar to that on said first board whereby said planar member as coupled to said lever means can move towards or away from said first or third boards, and circuit means coupled to said planar coil to provide an electrical output signal which varies according to the movement of said first planar board with respect to said first.

2. The transducer apparatus combination according to claim 1, wherein said circuit means includes an oscillator configuration operative to provide an output frequency which varies according to the magnitude of a deflection, with said at least one planar coil coupled to said oscillator to provide a variable frequency according to the position of said second planar member.

3. The transducer apparatus combination according to claim 1, wherein said first planar board contains first and second planar coils on a surface thereof, with said second planar member containing a shorted coil configuration, which shorted coil induces a different coupling factor when moved towards said first and second coils, whereby a different amplitude signal can be coupled from said first to said second coils according to the position of said shorted coil as pivoted by said second planar member.

4. The transducer apparatus combination according to claim 3, wherein said circuit means includes, a first pulse oscillator circuit having said first coil coupled thereto to provide a pulse output at a predetermined frequency according to the magnitude of said first coil, a detector circuit having said second coil coupled to an input thereof whereby said peaked signal is coupled from said first to said second coil according to the position of said shorted coil to cause said detector to provide an output signal having an amplitude which varies according to said position.

5. The transducer apparatus combination according to claim 1, further comprising a second planar coil positioned on said first board and separated from said first coil a predetermined distance.

6. An electronic scale assembly comprising in combination
   a scale housing having top movable platform for accommodating an item to be weighed, said platform coupled to a lever means located in said housing to move vertically according to the weight of said item,
   a transducer assembly comprising a first planar printed board having printed thereon a planar coil configuration, said planar board coupled to said housing a position relatively parallel to said platform and rigidly secured to said housing, and second planar member pivotally coupled to said first board at one end with said other end coupled to said lever means, and
   a third planar board positioned parallel to said first board and located beneath said planar member, said third board having deposited on a surface thereof at least one planar coil of a configuration similar to that of said first board whereby said planar member as coupled to said lever means can move towards or away from said first and third boards.

7. The electronic scale apparatus according to claim 5, wherein said circuit means includes a counter for dividing said output signal from said oscillator to a lower signal.

8. The electronic scale apparatus according to claim 7, further including a microprocessor having an input coupled to said counter for providing at an output a digital signal manifesting the weight of said item as connected by said microprocessor according to a predetermined algorithm.

9. The electronic scale apparatus according to claim 7, further including decoder and display means coupled to said output of said microprocessor for providing a visual readout of said digital signal indicative of the weight of said item.

10. The electronic scale apparatus according to claim 6, wherein said first planar printed board contains first and second planar coils printed on a surface thereof, with said second planar member containing a shorted coil configuration which shorted coil includes a different coupling factor when pivoted towards said first and second coils, whereby a different amplitude signal can be coupled from said first to said second coil according to the position of said shorted coil as pivoted by said second planar member.

11. The electronic scale apparatus according to claim 7, wherein said circuit means includes a read-only memory having a plurality of storage locations and having addressable inputs with said inputs coupled to said counter for addressing said memory for providing at an ouput a digital signal indicative of the weight of said item on said platform.

12. The electronic scale apparatus according to claim 11, further comprising digital display means coupled to said output of said memory and for providing a display of said digital signal indicative of the weight of said item.

13. The electronic scale according to claim 6, wherein the vertical movement of said lever means is between 0.040 to 0.3 inches.

14. The electronic scale according to claim 6, wherein said planar member is fabricated from a conducting material.

* * * * *